United States Patent

Slany et al.

[11] Patent Number: 6,103,867
[45] Date of Patent: Aug. 15, 2000

[54] CATALYST SYSTEMS FOR PRODUCING COPOLYMERS OF CARBON MONOXIDE AND OLEFINICALLY UNSATURATED COMPOUNDS

[75] Inventors: Michael Slany, Frankenthal; Arthur Höhn, Kirchheim, both of Germany

[73] Assignee: BASF Aktiengesellschaft, Ludwigshafen, Germany

[21] Appl. No.: 09/319,601

[22] PCT Filed: Dec. 1, 1997

[86] PCT No.: PCT/EP97/06714

§ 371 Date: Jun. 8, 1999

§ 102(e) Date: Jun. 8, 1999

[87] PCT Pub. No.: WO98/25991

PCT Pub. Date: Jun. 18, 1998

[30] Foreign Application Priority Data

Dec. 12, 1996 [DE] Germany .............. 196 51 786

[51] Int. Cl.⁷ .............. C08G 67/02; B01J 31/00
[52] U.S. Cl. .............. 528/392; 568/17; 524/701; 524/706; 524/709; 524/711; 524/712; 524/714; 524/742; 524/745; 502/152; 502/154; 502/158; 502/159; 502/162; 502/164; 502/168; 502/169
[58] Field of Search .............. 528/392; 568/17; 524/701, 706, 709, 711, 712, 714, 742, 745; 502/152, 154, 158, 159, 162, 164, 168, 169

[56] References Cited

U.S. PATENT DOCUMENTS

| | | |
|---|---|---|
| 3,985,700 | 10/1976 | Nicks et al. . |
| 4,798,884 | 1/1989 | Brons et al. .............. 528/491 |
| 4,851,379 | 7/1989 | Van Broekhoen et al. ....... 502/154 |
| 5,057,599 | 10/1991 | Wong ............... 528/392 |
| 5,102,844 | 4/1992 | Wong ............... 502/162 |
| 5,210,311 | 5/1993 | Wong ............... 568/17 |
| 5,731,473 | 3/1998 | Bryant et al. .......... 568/454 |
| 5,736,621 | 4/1998 | Simon et al. .......... 528/271 |

*Primary Examiner*—Samuel A. Acquah
*Attorney, Agent, or Firm*—Keil & Weinkauf

[57] ABSTRACT

The catalyst systems comprise as active constituents a) a metal complex of the formula (I)

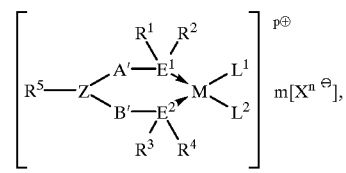

b) one or more Lewis or protic acids or a mixture of Lewis and protic acids.

7 Claims, No Drawings

CATALYST SYSTEMS FOR PRODUCING COPOLYMERS OF CARBON MONOXIDE AND OLEFINICALLY UNSATURATED COMPOUNDS

The present invention relates to novel catalyst systems for preparing copolymers of carbon monoxide and olefinically unsaturated compounds, comprising as active constituents a) a metal complex of the formula (I)

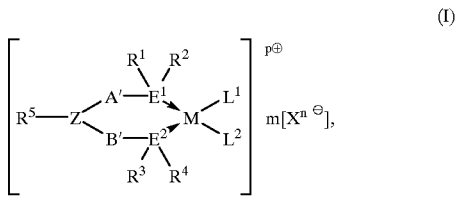

where the substituents and indices have the following meanings:

$R^5$ is hydrogen or a substituent selected from the group consisting of $C_1-C_{20}$-organic and $C_3-C_{30}$-organosilicon radicals in substituted and unsubstituted form, or a $NR^6R^7$ substituent or a radical of the formula II

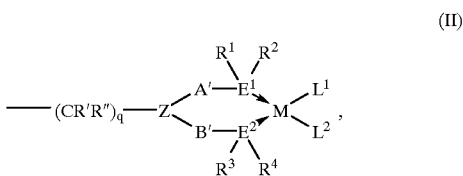

where
q is an integer from 0 to 20 and
R', R'' are hydrogen or substituents selected from the group consisting of $C_1-C_{20}$ organic and $C_3-C_{30}$-organosilicon radicals and the further substituents in (II) as in (I) have the following meanings, M is a metal from group VIIIB of the Periodic Table of the Elements, $E^1$, $E^2$ are elements from group VA of the Periodic Table of the Elements, Z is an element from group VA of the Periodic Table of the Elements, $R^1$ to $R^4$ are substituents selected, independently of one another, from the group consisting of $C_1-C_{20}$-organic and $C_3-C_{30}$-organosilicon radicals in substituted and unsubstituted form, A', B' are $C_1-C_4$-alkylene units in substituted and unsubstituted form, silylene-bridged organic radicals or $NR^8$ radicals, $R^6$ to $R^8$ are hydrogen or substituents selected from the group consisting of $C_1-C_{20}$-organic and $C_3-C_{30}$-organosilicon radicals, $L^1$, $L^2$ are formally charged or uncharged ligands,
X is a formally monovalent or polyvalent anion,
p is 0, 1, 2, 3 or 4,
m, n are 0, 1, 2, 3 or 4,
where p=m×n and b) one or more Lewis or protic acids or a mixture of Lewis and protic acids.

The present invention further relates to a process for preparing copolymers of carbon monoxide and olefinically unsaturated monomer compounds and also to the use of catalyst systems based on cis-bridged metal complexes for preparing copolymers of carbon monoxide and olefinically unsaturated monomer compounds. In addition, the invention relates to the use of the copolymers obtained according to the present invention for producing fibers, films, moldings and coatings and also to the fibers, films, moldings and coatings.

Catalyst systems for preparing copolymers of carbon monoxide and olefinically unsaturated compounds are adequately known. Active catalyst constituents used are generally cis-palladium complexes chelated by bidentate phosphine ligands, eg. $[Pd(R_2P(CH_2)_nPR_2)(OAc)_2]$ (cf. EP 0 121 965). Ligands which have been found to be particularly useful for the copolymerization of carbon monoxide with ethylene and/or propylene are bidentate phosphine ligands having a propylene bridge, with preference being given to using catalyst systems comprising, for example, $[(dmppp)Pd(OAc)_2](BF_4)_2$ as metal complex (dmppp=1,3-bis{di(2-methoxyphenyl)phosphino}propane) (cf. J. Organomet. Chem. 1991, 417, p. 235 ff).

1,3-Bis{di(2-methoxyphenyl)phosphino}propane) is, similarly to the bridging unit 1,3-bis{diphenylphosphino}propane (dppp) which is likewise frequently used in the copolymerization of carbon monoxide and olefinically unsaturated compounds, obtained by reacting 1,3-dibromopropane or 1,3-dichloropropane with the corresponding metal phosphides (cf. T. Yamagishi, S. Ikeda, M. Yatagai, M. Yamaguchi, M. Hida, J. Chem. Soc. Perkin Trans. 1, 1988, 1787–1790), but this necessitates the handling of extremely reactive and also highly flammable and toxic reagents. An industrial-scale process is therefore problematical for safety reasons; in any case even the conventional preparation of alkylene-bridged phosphine ligands requires a high outlay in terms of apparatus in order to keep the hazard potential as low as possible when handling halogen-containing, inflammable substances. Furthermore, unsymmetrically substituted alkylene-bridged ligands, ie. those having different phosphine substituents or containing different chelating atoms, are only obtainable to a limited extent from dibromo- or dichloro-terminated alkylene compounds. In addition, alkylene-bridged bidentate ligands are generally also not suitable for covalent linking to a support material, which considerably restricts their range of use.

Bidentate ligand systems which can be covalently coupled to a support are disclosed, for example, in European Patent Application EP-A 0 585 493, which describes phosphine ligands having a propylene bridge which has a tertiary hydroxyl group in the 2 position. However, a tertiary alcohol is naturally particularly sensitive, eg. to acids, and as a result of steric effects reacts relatively sluggishly, so that poor yields are to be expected from the outset for an ether of ester linkage with a spacer group. This is a disadvantage particularly in the case of highly functional chelating ligands whose preparation is complicated and costly. Furthermore, the synthesis of the phosphine ligands mentioned involves the use of extremely sensitive, toxic starting materials which are difficult to handle and require elaborate synthetic procedures (Na/fl. $NH_3$, $-78°$ C.) to convert them into the desired, symmetrical bisphosphine ligands.

Insofar as the effectiveness of a catalyst for homogeneous catalysis is generally decisively influenced by the nature of the metal and the chelating ligand, it would therefore be desirable to have recourse to a ligand system which can be modified in a variety of ways with very little outlay and can be prepared without problems in relatively large amounts starting from simple, nonhazardous parent compounds.

It is an object of the present invention to provide catalyst systems based on cis-bridged metal complexes for the copolymerization of carbon monoxide with olefinically unsaturated compounds, which catalyst systems comprise chelating ligands which can be obtained in a simple way from readily available and easy-to-handle parent compounds, even with an unsymmetrical substitution pattern.

We have found that this object is achieved by the catalyst systems defined in the introduction and by their use for the preparation of copolymers of carbon monoxide and olefinically unsaturated compounds.

We have also found a process for preparing copolymers of carbon monoxide and olefinically unsaturated monomer compounds. Furthermore, the use of the copolymers obtained according to the present invention for producing fibers, films, moldings and coatings and also the fibers, films, moldings and coatings have been found.

Preference is given to using a catalyst system comprising as active constituents:

a) a metal complex of the formula (I),

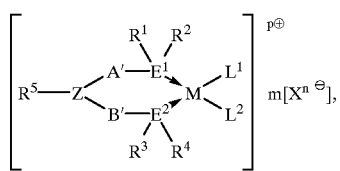

where the substituents and indices have the following meanings:

$R^5$ is hydrogen, an aliphatic radical, such as methyl, ethyl, i-propyl or t-butyl, a cycloaliphatic radical such as cyclopentyl or cyclohexyl, an aromatic radical such as phenyl, o-methoxyphenyl or 4-hydroxyphenyl, a substituent containing an anionic group, eg. $-(CH_2)_n-SO_3^-$, a substituent containing a cationic group, eg. $-(CH_2)_n-NR_3^+$, or a hydroxyl- or amino-containing substituent such as $-(CH_2)_n-OH$ or $-(CH_2)_n-NR_2$ (n=1 to 30), where R is hydrogen, aryl or alkyl, a radical of the formula (II)

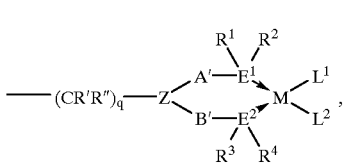

where
q is an integer from 0 to 20 and
R', R" are, independently of one another, hydrogen or $C_1-C_{10}$-alkyl, straight-chain or branched, such as methyl, ethyl, i-propyl or n-propyl, $C_3-C_{10}$-cycloalkyl such as cyclopropyl, cyclopentyl or cyclohexyl, $C_6-C_{14}$-aryl, such as phenyl, and the further substituents in (II) as in (I) have the following meanings, M is palladium or nickel,
$E^1$, $E^2$ are nitrogen or phosphorus,
Z is nitrogen or phosphorus,
$R^1$ to $R^4$ are cycloaliphatic radicals such as cyclopropyl, cyclopentyl, cyclohexyl or menthyl, branched aliphatic radicals such as i-propyl, s-butyl or t-butyl, aromatic radicals such as phenyl, o-methoxyphenyl or p-trifluoromethylphenyl, heteroaromatic radicals such as pyridyl, A', B' are methylene or ethylene in substituted or unsubstituted form, for example ethylidene or propylidene, benzylidene, o-phenylene, $L^1$, $L^2$ are hydride, sulfates, halides, phosphates, nitrate, acetonitrile, methanol, acetylacetone, tetrahydrofuran, acetate, trifluoroacetate, tosylate, water, X is tetrafluoroborate, hexafluorophosphate, hexafluoroantimonate, pentafluorobenzoate, trifluoromethanesulfonate, trifluoroacetate, perchlorate, p-toluenesulfonate, tetraarylborate, p is 0, 1, 2, 3 or 4, m, n are 0, 1, 2, 3 or 4, where p=m×n, and b) trifluoroacetic acid, perchloric acid, p-toluenesulfonic acid, triarylborane.

In a further embodiment, $L^1$ or $L^2$, but not simultaneously $L^1$ and $L^2$, in the active constituent a) of the catalyst system of the present invention is a halide.

Examples of particularly preferred constituents a) of the catalyst systems of the present invention are

[(bis(diphenylphosphinomethyl)phenylamine)bis(acetonitrile)palladium] bis(perchlorate),

[(bis(diphenylphosphinomethyl)phenylamine)bis(acetonitrile)palladium] bis(tetrafluoroborate),

[(bis(diphenylphosphinomethyl)phenylamine)bis(acetonitrile)palladium] bis(trifluoroacetate),

[(bis(diphenylphosphinomethyl)-t-butylamine)bis(acetonitrile)palladium] bis(perchlorate),

[(bis(diphenylphosphinomethyl)-t-butylamine)bis(acetonitrile)palladium] bis(tetrafluoroborate),

[(bis(diphenylphosphinomethyl)-t-butylamine)bis(acetonitrile)palladium] bis(trifluoroacetate), (bis(diphenylphosphinomethyl)phenylamine)bis(acetato)palladium and (bis(diphenylphosphinomethyl)-t-butylamine)bis(acetato)palladium and also

[(bis(diphenylphosphinomethyl)phenylamine)(acetonitrile)chloropalladium] perchlorate,

[(bis(diphenylphosphinomethyl)phenylamine)(acetonitrile)chloropalladium] tetrafluoroborate,

[(bis(diphenylphosphinomethyl)phenylamine)(acetonitrile)chloropalladium] trifluoroacetate,

[(bis(diphenylphosphinomethyl)-t-butylamine)(acetonitrile)chloropalladium] perchlorate,

[(bis(diphenylphosphinomethyl)-t-butylamine)(acetonitrile)chloropalladium] tetrafluoroborate,

[(bis(diphenylphosphinomethyl)-t-butylamine)(acetonitrile)chloropalladium] trifluoroacetate, (bis(diphenylphosphinomethyl)phenylamine)(chloro)(acetato)palladium and (bis(diphenylphosphinomethyl)-t-butylamine)(chloro)(acetato)palladium.

Fundamentally suitable constituents of the metal complexes (I) are, for example, chelating ligands which have the formula (III)

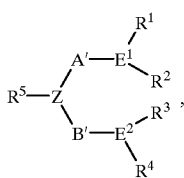

(III)

where the substituents and indices have the following meanings:

$R^5$ is hydrogen or a substituent selected from the group consisting of $C_1$–$C_{20}$-organic and $C_3$–$C_{30}$-organosilicon radicals in substituted and unsubstituted form, or a $NR^6R^7$-substituent or a radical of the formula (IV)

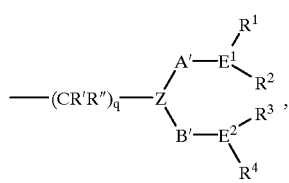

(IV)

where q is an integer from 0 to 20 and

R',R" are hydrogen or substituents selected from the group consisting of $C_1$–$C_{20}$-organic and $C_3$–$C_{30}$-organosilicon radicals and the further substituents in (II) as in (I) have the following meanings, $E^1$, $E^2$ are elements from group VA of the Periodic Table of the Elements, Z is an element from group VA of the Periodic Table of the Elements, $R^1$ to $R^4$ are substituents which are selected, independently of one another, from the group consisting of $C_1$–$C_{20}$-organic and $C_3$–$C_{30}$-organosilicon radicals in substituted and unsubstituted form, A', B' are $C_1$–$C_4$-alkylene units in substituted or unsubstituted form, silylene-bridged organic radicals or —$NR^8$— radicals, $R^6$ to $R^8$ are hydrogen or substituents selected from the group consisting of $C_1$–$C_{20}$-organic and $C_3$–$C_{30}$-organosilicon radicals.

Suitable metals M in the catalyst systems of the present invention are the metals of group VIIIB of the Periodic Table of the Elements, viz. iron, cobalt and nickel and especially the platinum metals ruthenium, rhodium, osmium, iridium and platinum and very particularly palladium. The metals can be present in the complexes in formally uncharged, formally singly positively charged or preferably formally double positively charged form.

Suitable elements $E^1$ and $E^2$ of the chelating ligand are the elements of main group V of the Periodic Table of the Elements (group VA), ie. nitrogen, phosphorus, arsenic, antimony or bismuth. Nitrogen or phosphorus is particularly suitable, in particular phosphorus. The chelating ligand can also contain different elements $E^1$ and $E^2$, for example nitrogen and phosphorus.

The bridging structural unit in the metal complexes (I) of the catalyst system of the present invention is composed of the components A', B' and Z (see formula (I)).

For the purposes of the present invention, a bridging structural unit is essentially a multiatom group which connects the elements $E^1$ and $E^2$ with one another.

The component Z is formed by an element of main group V of the Periodic Table of the Elements, ie. nitrogen, phosphorus, arsenic, antimony or bismuth. Preference is given to using nitrogen and phosphorus, but in particular nitrogen.

The units A' and B' can be organic or organosilicon radicals. Suitable organic radicals are $C_1$–$C_4$-alkylene units in substituted and unsubstituted form, for example methylene, ethylene, propylene and also ethylidene, propylidene and benzylidene. Preference is given to using methylene, ethylene, ethylidene and benzylidene, particularly preferably methylene.

Furthermore, A' and B' can be, likewise independently of one another, silylene radicals such as —R'"—Si—R""—, where R'", R""are $C_1$–$C_4$-alkylene units in substituted and unsubstituted form, eg. methylene, ethylene or ethylidene, arylene units, in particular o-phenylene, or aralkylidene units, in particular benzylidene, and where the free valences on the silicon can be occupied by alkyl groups such as methyl, i-propyl or t-butyl, aryl groups such as phenyl or aralkyl groups such as benzyl.

A' and B' can each also be an —$NR^8$-unit, where $R^8$ is hydrogen or a substituent selected from the group consisting of $C_1$–$C_{20}$-organic and $C_3$–$C_{30}$-organosilicon radicals, for example $C_1$–$C_{10}$-alkyl, in particular methyl or ethyl, aryl, in particular phenyl, or aralkyl, in particular benzyl.

A' and B' can likewise be a monoatomic, diatomic, triatomic or tetraatomic constituent of an aliphatic or aromatic ring system. For example, A' and B' can be a methylene or ethylene unit of a cyclopropyl, cyclopentyl or cyclohexyl ring. Other possible ring systems are aliphatic and aromatic heterocycles.

A' and A' can also be constituent of a heterocycle which is formed by the components A'—Z—$R^5$ or B'—Z—$R^5$, ie. A'—Z—$R^5$ or B'—Z—$R^5$ can, for example, form a substituted or unsubstituted pyrrolidine or piperidine ring.

In the case of a monoatomic organic bridge between Z and $E^1$ or $E^2$, A' and B' are preferably, independently of one another a —$CR^9R^{10}$-unit, where $R^9$ and $R^{10}$ can be, likewise independently of one another, hydrogen, $C_1$–$C_{10}$-alkyl such as methyl, ethyl or propyl, $C_6$–$C_{14}$-aryl such as phenyl, $C_7$–$C_{20}$-aralkyl or heteroaryl. Furthermore, the monoatomic bridge together with the radicals $R^9$ and $R^{10}$ can form a ring system such as cyclopropyl, cyclopentyl or cyclohexyl.

Suitable organic radicals $R^1$ to $R^4$ are, independently of one another, for example aliphatic and cycloaliphatic radicals and also aromatic and heteroaromatic radicals each having from 1 to 20 carbon atoms.

Suitable straight-chain aliphatic radicals are, inter alia, ethyl, ethyl, propyl, butyl, pentyl, hexyl and octyl.

Suitable branched aliphatic radicals are $C_3$–$C_{20}$-, preferably $C_3$–$C_{12}$-alkyl radicals such as i-propyl, i-butyl, s-butyl, neopentyl and t-butyl.

Particularly suitable branched aliphatic radicals are t-butyl, i-propyl and s-butyl.

Alkyl groups having branching located further out are also well suited as substituents $R^1$ to $R^4$, for example i-butyl, 3-methylbut-2-yl and 4-methylpentyl.

Suitable cycloaliphatic radicals are $C_3$–$C_{10}$-monocyclic radicals such as cyclopropyl, cyclobutyl, cyclopentyl, cyclohexyl and menthyl or bicyclic radicals such as norbornyl, pinanyl, bornyl and bicyclononyl, each having any linkage points of the ring framework to the atoms $E^1$ and $E^2$. The cycloaliphatic radicals preferably contain a total of from 5 to 20 carbon atoms; very particular preference is given to cyclohexyl and menthyl.

Also suitable are linear arylalkyl groups each having from 1 to 6 carbon atoms in the alkyl radical and from 6 to 14 carbon atoms in the aryl radical, for example benzyl.

Suitable aryl radicals are aromatic systems having from 6 to 20 carbon atoms in substituted or unsubstituted form, for example phenyl, tolyl, p-trifluoromethylphenyl, xylyl or anisyl; preference is given to using phenyl or o-methoxyphenyl.

Suitable heteroaryl radicals are quite generally $C_3$–$C_{20}$-compounds containing preferably from 1 to 3 nitrogen atoms per ring, eg. pyridyl, pyrimidyl, pyrazinyl or triazinyl, or alkyl- or aryl-substituted heteroaryl.

The radicals $R^1$ to $R^4$ can also contain atoms from groups IVA, VA, VIA and VIIA of the Periodic Table of the Elements, for example halogen, oxygen, sulfur, nitrogen or silicon, here, for example, the bis(trimethylsilyl)methyl group. Functional groups such as hydroxy, alkoxy, amino and cyano which are inert under the polymerization conditions are also possibilities in this context.

Preferred heterosubstituents $R^1$ to $R^4$ are $C_3$–$C_{30}$-organosilicon radicals, ie. tetravalent silicon atoms which are bonded to $E^1$ or $E^2$ and whose remaining valences are occupied by three organic radicals, where the total number of carbon atoms of these three radicals bonded to silicon is in the range from three to thirty. Examples which may be mentioned are the trimethylsilyl, t-butyldimethylsilyl or triphenylsilyl group, in particular the trimethylsilyl group.

The radicals $R^1$ to $R^4$ in a metal complex (I) can be identical, be matched only in pairs, eg. z.B. $R^1$=$R^2$ or $R^1$=$R^3$ or $R^3$=$R^4$, or be completely different from one another.

The radicals $R^1$ to $R^4$ should preferably be sufficiently bulky so as to substantially screen the central atom, eg. the palladium atom, with which the atoms $E^1$ and $E^2$ form the active complex. Radicals which meet this requirement are, for example, cycloaliphatic radicals and also branched aliphatic radicals, particularly those branched in the a-position.

Suitable substituents $R^5$ are, for example, hydrogen and substituents selected from the group consisting of $C_1$–$C_{20}$-organic and $C_3$–$C_{30}$-organosilicon radicals in substituted and unsubstituted form. Said organic radicals include, for example, straight-chain and branched $C_1$–$C_{20}$-aliphatic units such as methyl, ethyl, n-propyl, i-propyl, n-butyl, i-butyl, s-butyl, t-butyl and also pentyl, hexyl, octyl and their structural analogs, cycloaliphatic units, for example $C_3$–$C_{10}$-monocyclic radicals such as cyclopropyl, cyclopentyl and cyclohexyl, or bicyclic radicals such as norbornyl, and also $C_6$–$C_{20}$-aryl groups which may be monosubstituted or polysubstituted by alkyl, aryl or functional groups based on elements from groups IVA, VA, VIA and VIIA of the Periodic Table of the Elements, for example silyl, amino, alkoxy or halogen. Furthermore, $R^5$ can be an aralkyl group such as benzyl, or a heteroaryl group such as pyridyl or pyrimidyl.

$R^5$ may also be, for example, a substituted or unsubstituted $C_1$–$C_{20}$-alkylene chain which contains a functionalized end group and may also contain heteroatoms such as oxygen or nitrogen, or arylene units such as phenylene in the alkylene chain. Preference is given to an alkylene group —$(CH_2)_n$—Q, where Q is —$SO_3^\ominus$, —$CO_2^\ominus$, —$CO_2R$, —$CONR_2$, halogen, in particular F, Cl, Br, I, hydroxy, —$OR_1$—$NR_2$ or —$NR_3^\oplus$ and n=5–30. R is quite generally an aryl or alkyl radical or hydrogen.

Furthermore, $R^5$ can be —$NR^6R^7$, where $R^6$ and $R^7$ are, independently of one another, substituents selected from the group consisting of $C_1$–$C_{20}$-organic and $C_3$–$C_{30}$-organosilicon radicals and where the latter radicals can include the substituents listed above under $R^5$. $R^6$, $R^7$ are preferably methyl, ethyl, i-propyl, phenyl or benzyl.

Possible heterosubstituents $R^5$ also include $C_3$–$C_{30}$-organosilicon radicals in which the total number of carbon atoms of the three organic radicals bonded to the silicon atom is in the range from 3 to 30. Examples which may be mentioned are the trimethylsilyl, t-butyldimethylsilyl and the triphenylsilyl groups.

$R^5$ may also be, for example, a radical of the formula (II)

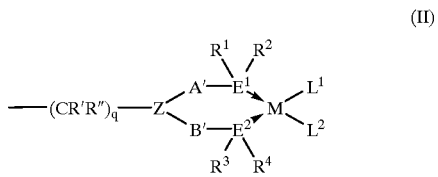

(II)

where q is an integer from 0 to 20 and R', R" are hydrogen or substituents selected from the group consisting of $C_1$–$C_{20}$-organic and $C_3$–$C_{30}$-organosilicon radicals. The further substituents Z, A', B', $E^1$, $E^2$, $R^1$ to $R^4$, M and $L^1$, $L^2$ in (II) here correspond to their meanings given for formula (I), where, in the metal complexes (I), if $R^5$=(II) the two bidentate chelating ligands then present in (I) do not have to be identical. Rather, the present invention also covers those metal complexes in which the respective substituents are partly or completely different. Accordingly, examples of possible compounds are

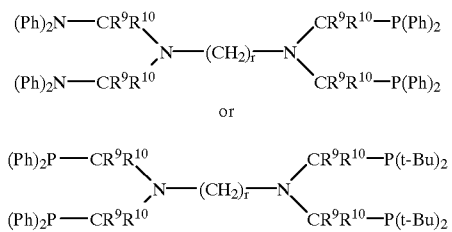

where r=0–10
and $R^9$, $R^{10}$, can, independently of one another, be the above-described substituents.

As radicals $R^5$, preference is given to using t-butyl, phenyl, o-methoxyphenyl, p-trifluoromethylphenyl, 4-aminophenyl, 4-N,N'-dimethylaminophenyl, 4-hydroxyphenyl or —$(CH_2)_n$—$SO_3^\ominus$, —$(CH_2)_n$—$NR_3^\oplus$, —$(CH_2)_n$—OH, where n=1–20, preferably n=5–20.

Suitable formally charged inorganic ligands $L^1$, $L^2$ are hydride, halides, sulfates, phosphates or nitrate.

Preference is given to using halides such as chloride, bromide, and iodide, in particular chloride.

In a preferred embodiment, one of the ligands $L^1$ and $L^2$ in the metal complex (I) is a halide.

Furthermore, $L^1$ and $L^2$ can be carboxylates such as acetate, trifluoroacetate, propionate, oxalate, citrate or benzoate, in particular acetate.

Suitable formally charged organic ligands $L^1$, $L^2$ are $C_1$–$C_{20}$-aliphatic radicals, $C_3$–$C_{30}$-cycloaliphatic radicals, $C_7$–$C_{20}$-aralkyl radicals having a $C_6$–$C_{10}$-aryl radical and a $C_1$–$C_{10}$-alkyl radical, $C_6$–$C_{20}$-aromatic radicals, for example methyl, ethyl, propyl, i-propyl, t-butyl, neo-pentyl, cyclohexyl, benzyl, neophyl, phenyl and aliphatically or aromatically substituted phenyl radicals.

Further suitable formally charged organic ligands are $C_1$–$C_{20}$-carboxylates such as acetate, propionate, oxalate, benzoate and citrate and also salts of organic sulfonic acids, for example methylsulfonate, trifluoromethylsulfonate and p-toluenesulfonate. Preference is given to using $C_1$–$C_7$-carboxylates, sulfonic acid derivatives and in particular acetate and p-toluenesulfonate.

Suitable formally uncharged ligands $L^1$, $L^2$ are Lewis bases in general, ie. compounds having at least one free electron pair. Particularly well suited are Lewis bases whose free electron pair or pairs is/are located on a nitrogen or oxygen atom, for example nitriles, R—CN, ketones, ethers, alcohols or water. Preference is given to using $C_1$–$C_{10}$- nitriles such as acetonitrile, propionitrile, benzonitrile or $C_2-C_{10}$-ketones such as acetone, acetylacetone or else $C_2-C_{10}$-ethers such as dimethyl ether, diethyl ether, tetrahydrofuran. Particular preference is given to using acetonitrile or tetrahydrofuran.

In principle, the ligands $L^1$ and $L^2$ can be present in any ligand combination, ie. the metal complex (I) can contain, for example, a nitrate ligand and a formally charged organic ligand such as t-butyl, or an acetonitrile ligand and a halide ligand.

Depending on the formal charge of the fragment of the complex containing the metal M, the metal complexes contain anions X. However, if the M-containing fragment of the complex is formally uncharged, the complex (I) of the present invention contains no anion X. Use is advantageously made of anions X which have very little nucleophilicity, ie. have a very low tendency to form a chemical bond with the central metal M.

Suitable anions X are, for example, perchlorate, sulfate, phosphate, nitrate and carboxylates such as acetate, trifluoroacetate, trichloroacetate, propionate, oxalate, citrate, and benzoate, and also conjugated anions of organosulfonic acids, eg. methylsulfonate, trifluoromethylsulfonate and para-toluenesulfonate, also tetrafluoroborate, tetraphenylborate, tetrakis(pentafluorophenyl)borate, hexafluorophosphate, hexafluoroarsenate or hexafluoroantimonate. Preference is given to using perchlorate, trifluoroacetate, sulfonates such as methylsulfonate, trifluoromethylsulfonate, p-toluenesulfonate, tetrafluoroborate or hexafluorophosphate, in particular trifluoromethylsulfonate, trifluoroacetate, perchlorate or p-toluenesulfonate.

Particularly suitable constituents are chelating ligands of the formula (III) in which the substituents have the following meanings:

$E^1$, $E^2$ are nitrogen or phosphorus,

Z is nitrogen or phosphorus, $R^1$ to $R^4$ are, independently of one another, straight-chain or branched $C_1-C_{20}$-aliphatic radicals such as methyl, ethyl, n-propyl, i-propyl, n-butyl, i-butyl, s-butyl, t-butyl and also pentyl, hexyl, octyl and their structural analogs, aliphatic $C_3-C_{10}$-monocyclic radicals such as cyclopropyl, cyclobutyl, cyclopentyl, cyclohexyl, menthyl, bicyclic radicals such as norbornyl, pinanyl, bornyl, bicyclononyl, $C_6-C_{20}$-aryl radicals in substituted and unsubstituted form, eg. phenyl, tolyl, xylyl, o-methoxyphenyl or p-trifluoromethylphenyl, $C_3-C_{20}$-heteroaryl radicals such as pyridyl, pyrimidyl, pyrazinyl, triazinyl including those substituted by alkyl or aryl groups, or aralkyl radicals each having from 1 to 6 carbon atoms in the alkyl radical and from 6 to 14 carbon atoms in the aryl radical, $R^5$ is hydrogen, a straight-chain or branched $C_1-C_{20}$-aliphatic radical such as methyl, ethyl, n-propyl, i-propyl, n-butyl, i-butyl, s-butyl, l-butyl and also pentyl, hexyl, octyl and their structural analogs, a $C_3-C_{10}$-aliphatic monocyclic radical such as cyclopropyl, cyclopentyl or cyclohexyl, a bicyclic radical such as norbornyl, pinanyl, bornyl, or bicyclononyl, a $C_6-C_{20}$-aryl group such as phenyl or naphthyl which may be monosubstituted or polysubstituted by alkyl, aryl or functional groups based on elements of main groups IV, V, VI and VII of the Periodic Table of the Elements, eg. silyl, amino, alkoxy, hydroxy or halogen, an aralkyl radical having from 1 to 6 carbon atoms in the alkyl radical and from 6 to 14 carbon atoms in the aryl radical, eg. benzyl, a $C_3-C_{20}$-heteroaryl radical such as pyridyl, pyrimidyl, pyrazinyl, triazinyl, also substituted by alkyl or aryl groups, a functionalized $C_5-C_{30}$-alkylene radical $-(CH_2)_n-Q$, also substituted, if desired, by heteroatoms such as oxygen or nitrogen, or arylene units such as phenylene, in the alkylene chain, where $Q=-SO_3$, $CO_2$, $CO_2R$, $-CONR_2$, halogen, (F, Cl, Br, I), $-NR_2$, $-OR$, $NR_3^{\oplus}$ and n=5–30, particularly preferably 10–30, where R is, for example hydrogen, $C_1-C_{20}$-alkyl or $C_6-C_{20}$-aryl, an amino radical $-NR^6R^7$, where $R^6$, $R^7$ are as defined above, or a $C_3-C_{30}$-organosilicon radical such as trimethylsilyl, t-butyldimethylsilyl, triphenylsilyl.

A', B' are $C_1-C_4$-alkylene units, also substituted, such as methylene, ethylene, n-propylene, ethylidene, propylidene, benzylidene and silylene radicals $-R'''SiR''''-$, where $R'''$, $R''''$ are $C_1-C_2$-alkylene units, also substituted, and the free valences on the silicon are occupied by alkyl groups such as methyl or aryl groups such as phenyl, $-NR^8$-radicals where $R^8$ is $C_1-C_4$-alkyl, also substituted, such as methyl or ethyl, aryl, such as phenyl, a monoatomic, diatomic, triatomic or tetraatomic constituent of an aliphatic or aromatic ring system, eg. the methylene or ethylene unit in cyclopropyl, cyclopentyl, cyclohexyl.

Preference is given to using bridged diphosphines (III) having at least one nitrogen atom in the bridge as chelating ligand, for example bis(diphenylphosphinomethyl)phenylamine,
bis(diphenylphosphinomethyl)-t-butylamine,
bis(diphenylphosphinomethyl)methylamine,
bis(dicyclohexylphosphinomethyl)phenylamine,
bis(dicyclohexylphosphinomethyl)-t-butylamine,
bis(dicyclohexylphosphinomethyl)methylamine,
bis(di-t-butylphosphinomethyl)phenylamine,
bis(di-t-butylphosphinomethyl)-t-butylamine,
bis(di-t-butylphosphinomethyl)methylamine,
bis(o-methoxyphenylphosphinomethyl)phenylamine,
bis(o-methoxyphenylphosphinomethyl)-t-butylamine,
bis(o-methoxyphenylphosphinomethyl)methylamine,
bis(diphenylphosphinoethylidene)phenylamine,
bis(diphenylphosphinoethylidene)-t-butylamine,
bis(dipheylphosphinoethylidene)methylamine,
bis(dicyclohexylphosphinoethylidene)phenylamine,
bis(dicyclohexylphosphinoethylidene)-t-butylamine,
bis(dicyclohexylphosphinoethylidene)methylamine,
bis(di-t-butylphosphinoethylidene)phenylamine,
bis(di-t-butylphosphinoethylidene)-t-butylamine,
bis(di-t-butylphosphinoethylidene)methylamine,
bis(o-methoxyphenylphosphinoethylidene)phenylamine,
bis(o-methoxyphenylphosphinoethylidene)-t-butylamine,
bis(o-methoxyphenylphosphinoethylidene)methylamine,
bis (diphenylphosphinobenzylidene)phenylamine,
bis(diphenylphosphinobenzylidene)-t-butylamine,
bis(diphenylphosphinobenzylidene)methylamine,
bis(dicyclohexylphosphinobenzylidene)phenylamine,
bis(dicyclohexylphosphinobenzylidene)-t-butylamine,
bis(dicyclohexylphosphinobenzylidene)methylamine,
bis(di-t-butylphosphinobenzylidene)phenylamine,
bis(di-t-butylphosphinobenzylidene)-t-butylamine,
bis(di-t-butylphosphinobenzylidene)methylamine,
bis(o-methoxyphenylphosphinobenzylidene)phenylamine,
bis(o-methoxyphenylphosphinobenzylidene)-t-butylamine,
bis(o-methoxyphenylphosphinobenzylidene)methylamine,
bis(diphenylphosphinopropylidene)phenylamine,
bis(diphenylphosphinopropylidene)-t-butylamine,
bis(diphenylphosphinopropylidene)methylamine,
bis(dicyclohexylphosphinopropylidene)phenylamine, bis(dicyclohexylphosphinopropylidene)-t-butylamine,
bis(dicyclohexylphosphinopropylidene)methylamine,
bis(di-t-butylphosphinopropylidene)phenylamine,
bis(di-t-butylphosphinopropylidene)-t-butylamine,
bis(di-t-butylphosphinopropylidene)methylamine,
bis(o-methoxyphenylphosphinopropylidene)phenylamine,
bis(o-methoxyphenylphosphinopropylidene)-t-butylamine,
bis(o-methoxyphenylphosphinopropylidene)methylamine.

Also suitable are, analogously to the above list, compounds in which $R^5$ is a p-hydroxyphenyl group or a $C_3-C_{10}$-alkanol group such as 4-butanol.

Furthermore, it is also possible to use chelating ligands (III) in which $E^1$ and $E^2$ bear nonidentical substituents $R^1$ to $R^4$. In one embodiment of the present invention, the radicals $R^1$ and $R^2$ on $E^1$ or $R^3$ and $R^4$ on $E^2$ are in each case the same, but $R^1$, $R^2$ is not identical to $R^3$ $R^4$.

Examples of suitable compounds of this type are: (diphenylphosphinomethyl)(dicyclohexylphosphinomethyl) phenylamine, (diphenylphosphinomethyl)(di-t-butylphosphinomethyl)phenylamine, (di-o-methoxyphenylphosphinomethyl) (dicyclohexylphosphinomethyl)-t-butylamine and all further combinations of the amine substituents shown in the above list, provided that these lead to bisphosphine compounds.

In addition, any possible combination of radicals $R^1$ to $R^4$ which leads to unsymmetrical chelating ligands could be used.

Furthermore, particular mention may also be made of those chelating ligands which bear a charged functional group in the radical $R^5$, for example
bis(diphenylphosphinomethyl)(sulfonatomethyl)amine,
bis(diphenylphosphinomethyl)(2-sulfonatoethyl)amine,
bis(diphenylphosphinomethyl)(3-sulfonatopropyl)amine or
bis(diphenylphosphinomethyl)(4-sulfonatobutyl)amine,
bis(diphenylphosphinomethyl)(12-sulfonatododecenyl) amine or
bis(diphenylphosphinomethyl)(18-sulfonatooctadecenyl) amine.

The chelating ligands (III) can be used for preparing the metal complexes (I) of the present invention.

The preparation of the chelating phosphines (III) can be carried out as described in A. L. Balch, M. M. Olmstead, S. P. Rowley, Inorg. Chim. Acta, 1990, 168, 255–264 or J. Fawcett, P. A. T. Hoye, R. D. W. Kemmitt, D. J. Law, D. R. Russell, J. Chem. Soc., Dalton Trans. 1993, 2563–2568. For example, diphenylphosphine is reacted with paraformaldehyde and aniline in toluene at 65° C. to give, after a reaction time of about 4 hours, the chelating phosphine in high yield.

The metal complexes of the present invention having the formula (I) can be prepared by the following methods.

The uncharged chelate complexes (p=0) are prepared by replacing weakly coordinating ligands such as 1,5-cyclooctadiene, benzonitrile or tetramethylethylenediamine which are bound to the corresponding transmission metal compounds, for example transition metal halides, transition metal (alkyl) (halides) or transition metal diorganyls, by the chelating ligands of the present invention having the formula (III) as defined above.

The reaction is generally carried out in a solvent such as dichloromethane at from −78 to 40° C.

Furthermore, uncharged metal complexes (I) in which $L^1$ and $L^2$ are carboxylate eg. acetate, can be prepared by reacting, for example, $Pd(OAc)_2$ with the chelating ligands described in toluene or acetone at room temperature.

A further synthetic method is reaction of the chelate complexes of the formula (III) with organometallic compounds of groups IA, IIA, IVA and IIB, for example $C_1-C_6$-alkyls of the metals lithium, aluminum, magnesium and zinc, with formally charged inorganic ligands $L^1$, $L^2$ as defined above being replaced by formally charged aliphatic, cycloaliphatic or aromatic ligands $L^1$, $L^2$ likewise as defined above. The reaction is generally carried out in a solvent such as diethyl ether or tetrahydrofuran at from −78 to 65° C.

Monocationic complexes of the formula (I) (p=1) are formed by reacting (chelating ligand)metal-(halide) (organic)-complexes of the formula (I) in which $L^1$ is halogen and $L^2$ is a formally charged organic ligand as defined above (with the exception of the anions of organic acids) with metal salts MX. Furthermore, monocationic complexes of the formula (I) can be obtained by reacting (chelating ligand)metal (dihalide) complexes with stoichiometric amounts of a metal salt MX. The reactions are generally carried out in coordinating solvents such as acetonitrile or tetrahydrofuran at from −78 to 65° C.

It is advantageous if the metal salts MX meet the following criteria. The metal M should preferably form sparingly soluble metal chlorides, for example silver chloride. The salt anion should preferably be a non-nucleophilic anion X, as defined above.

Well suited salts for the formation of cationic complexes are silver tetrafluoroborate, silver hexafluorophosphate, silver trifluoromethanesulfonate, silver perchlorate, silver para-toluenesulfonate, silver trifluoroacetate and silver trichloroacetate.

The dicationic complexes (p=2) are prepared using a method similar to that for the monocationic complexes, except that now the (chelating ligand)metal (dihalide) complexes are used as precursors in place of the (chelating ligand)metal-(halide)-(organic) complexes.

A further possible method of preparing the dicationic complexes (I) is reaction of $[G_4M]X_2$ with the chelating ligands of the formula (III) defined in the introduction. Here, G are identical or different weak ligands such as acetonitrile, benzonitrile or 1,5-cyclooctadiene and M and X are as defined above.

A preferred method of preparing the metal complexes of the formula (I) is reaction of the dihalide metal precursor complexes with silver salts having non-coordinating anions.

The ratio of the catalyst constituents to one another is generally selected such that the molar ratio of metal complex (I) (constituent a)) to Lewis and/or protic acid (constituent b)) is in the range from 0.01:1 to 10:1, preferably in the range from 0.1:1 to 1:1.

The constituent a) may be either exclusively the metal complex (I) or a mixture consisting of the defined metal complex (I) and a proportion of free chelating compound (III).

The molar ratio of metal complex (I) to chelating ligand (III) is accordingly usually in the range from 0.01:1 to 10:1, preferably in the range from 0.1:1 to 2:1.

The catalyst systems of the present invention can be used for preparing copolymers of carbon monoxide and olefinically unsaturated monomer compounds.

The monomers are generally built alternately into the copolymer.

Suitable olefinically unsaturated monomer compounds are in principle all monomers of this class of compounds.

Preference is given to ethylene and $C_3-C_{10}$-alk-1-enes such as principally propene, also butadiene as well as cycloolefins such as cyclopentene, cyclohexene, norbornene and norbornadiene and its derivatives.

Olefinically unsaturated aromatic monomers include, first and foremost, styrene and α-methylstyrene.

Other monomers of particular importance are acrylic acid and methacrylic acid and also their derivatives, among these particularly the nitriles, the amides and the $C_1-C_6$-alkylesters, for example ethyl acrylate, n-butyl acrylate, t-butyl acrylate, methyl methacrylate.

Further suitable monomers are vinyl chloride, vinyl acetate, vinyl propionate, maleic anhydride and N-vinylpyrrolidone.

Of course it is also possible to use mixtures of different monomers; the mixing ratio is generally not critical.

To prepare copolymers of carbon monoxide and olefinically unsaturated monomer compounds, the monomers can be copolymerized in the presence of a catalyst whose active composition is formed by a metal complex of the formula (I)

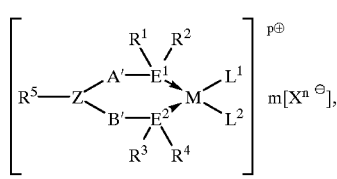

where the substituents and indices have the following meanings:

$R^5$ is hydrogen or a substituent selected from the group consisting of $C_1$–$C_{20}$-organic and $C_3$–$C_{30}$-organosilicon radicals in substituted and unsubstituted form, or a $NR^6R^7$ substituent or a radical of the formula II

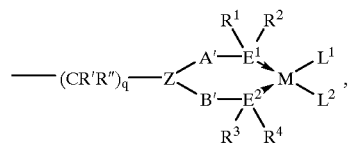

where
q is an integer from 0 to 20 and
R', R" are hydrogen or substituents selected from the group consisting of $C_1$–$C_{20}$ organic and $C_3$–$C_{30}$-organosilicon radicals and
the further substituents in (II) as in (I) have the following meanings,
M is a metal from group VIIIB of the Periodic Table of the Elements,
$E^1$, $E^2$ are elements from group VA of the Periodic Table of the Elements,
Z is an element from group VA of the Periodic Table of the Elements,
$R^1$ to $R^4$ are substituents selected, independently of one another, from the group consisting of $C_1$–$C_{20}$-organic and $C_3$–$C_{30}$-organosilicon radicals in substituted and unsubstituted form,
A', B' are $C_1$–$C_4$-alkylene units in substituted and unsubstituted form, silylene-bridged organic radicals or $NR^8$ radicals,
$R^6$ to $R^8$ are hydrogen or substituents selected from the group consisting of $C_1$–$C_{20}$-organic and $C_3$–$C_{30}$-organosilicon radicals,
$L^1$, $L^2$ are formally charged or uncharged ligands,
X is a formally monovalent or polyvalent anion,
p is 0, 1, 2, 3 or 4,
m, n are 0, 1, 2, 3 or 4,
where p=m×n and b) one or more Lewis or protic acids or a mixture of Lewis and protic acids.

Copolymers of carbon monoxide and olefinically unsaturated compounds can likewise be obtained by reacting the monomers in the presence of a metal complex of the formula (I)

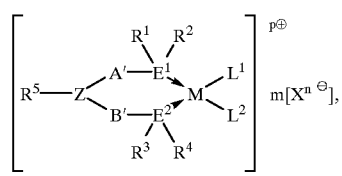

where the substituents and indices have the following meanings $R^5$ is hydrogen or a substituent selected from the group consisting of $C_1$–$C_{20}$-organic and $C_3$–$C_{30}$-organosilicon radicals in substituted and unsubstituted form, or a $NR^6R^7$ substituent or a radical of the formula II

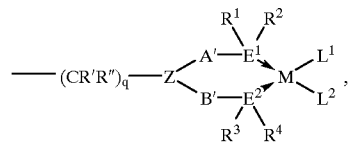

where
q is an integer from 0 to 20 and
R', R" are hydrogen or substituents selected from the group consisting of $C_1$–$C_{20}$ organic and $C_3$–$C_{30}$-organosilicon radicals and
the further substituents in (II) as in (I) have the following meanings,
M is a metal from group VIIIB of the Periodic Table of the Elements,
$E^1$, $E^1$ are elements from group VA of the Periodic Table of the Elements,
Z is an element from group VA of the Periodic Table of the Elements,
$R^1$ bis $R^4$ are substituents selected, independently of one another, from the group consisting of $C_1$–$C_{20}$-organic and $C_3$–$C_{30}$-organosilicon radicals in substituted and unsubstituted form,
A', B' are $C_1$–$C_4$-alkylene units in substituted and unsubstituted form, silylene-bridged organic radicals or $NR^8$ radicals,
$R^6$ bis $R^8$ are hydrogen or substituents selected from the group consisting of $C_1$–$C_{20}$-organic and $C_3$–$C_{30}$-organosilicon radicals,
$L^1$, $L^2$ are uncharged ligands, in particular acetonitrile, methanol, water,
X is a formally monovalent or polyvalent anion, in particular perchlorate, trifluoroacetate, p-toluenesulfonate, tetrafluoroborate, trifluoromethylsulfonate,
p is 0, 1, 2, 3 or 4,
m, n are 0, 1, 2, 3 or 4,
where p=m×n.

Uncharged ligands $L^1$, $L^2$ used in the above-described process are preferably acetonitrile, tetrahydrofuran, water and methanol; suitable anions X are, in particular, perchlorate and trifluoroacetate anions.

A further possible process for preparing copolymers of carbon monoxide and olefinically unsaturated compounds is reaction of the monomers in the presence of a catalyst whose active composition is formed by i) a metal M selected from group VIIIB of the Periodic Table of the Elements, which is present in salt form or as a complex salt, ii) a chelating ligand of the formula (III)

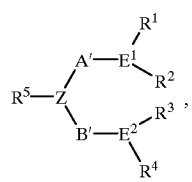

(III)

where the substituents and indices are as defined above, and iii) one of more protic or Lewis acids or a mixture or protic and Lewis acids.

Suitable salts of usually divalent metals M are halides, sulfates, phosphates, nitrates and carboxylates such as acetates, propionates, oxalates, citrates, benzoates, and also sulfonic acid salts such as methylsulfonates, trifluoromethylsulfonate and p-toluenesulfonate. Preference is given to using carboxylates, sulfonic acid derivatives and, in particular, acetates.

Particularly suitable catalyst components I) are palladium dicarboxylate, preferably palladium diacetate, palladium dipropionate, palladium bis(trifluoroacetate) and palladium oxalate, and also palladium sulfonates, preferably palladium bis(trifluoromethanesulfonate), palladium bis(methanesulfonate), palladium bis(p-toluenesulfonate); particular preference is given to using palladium diacetate.

As catalyst constituents b) or iii), it is possible to use Lewis and protic acids and mixtures thereof.

Suitable protic acids b) or iii) are strong mineral acids, preferably those having a pKa of less than 3, for example sulfuric acid and perchloric acid, and also strong organic acids, for example trichloroacetic and trifluoroacetic acid and also the sulfonic acids methanesulfonic acid, p-toluenesulfonic acid and benzenesulfonic acid.

Also suitable are the acidic salts of strong acids with weak bases, for example ammonium salts of the abovementioned acids.

Examples of suitable Lewis acids are halides of the elements of group IIIA of the Periodic Table of the Elements, for example boron trifluoride, boron trichloride, aluminum trifluoride, aluminum trichloride, halides of the elements of group VA of the Periodic Table of the Elements, for example phosphorus pentafluoride, antimony pentafluoride, and also halides of the metals of transition group IVB of the Periodic Table of the Elements, for example titanium tetrachloride or zirconium tetrachloride. Further suitable Lewis acids are organically substituted Lewis acids, for example tris (pentafluorophenyl) borane.

Lewis acids which are preferably used are boron trifluoride, antimony pentafluoride or tris (pentafluorophenyl)borane.

Particularly preferred components b) or iii) are those which have a weakly coordinating conjugated anion, ie. an anion which forms only a weak bond to the central metal of the complex, for example tetrafluoroborate, hexafluorophosphate, perchlorate, trifluoroacetate, trifluoromethylsulfonate, p-tosylate and borates such as catecholatoborate and tetraarylborate, where suitable aryl groups are, in particular, 2,5-dimethylphenyl, 2,5-bis (trifluoromethyl)phenyl and pentafluorophenyl.

As component ii), the catalyst systems comprise a chelate compound (III) which has been described above when discussing the active constituent a) of the catalyst system of the present invention.

In the in-situ generation of the polymerization catalysts, the usually divalent metals M are used in the form of their salts and are brought into contact with the chelate compound ii) of the formula (III) and the acid(s) iii). This can occur before contact of the catalytically active composition obtainable in this way with the monomers, generally outside the polymerization reactor. However, the reaction of the individual components metal salt i), chelate compound ii) and acid iii) can also be carried out in the polymerization reactor in the presence of the monomers.

The ratio of the catalyst constituents i), ii) and iii) to one another is generally selected such that the molar ratio of metal compound i) to component ii) is from 0.01:1 to 10:1, preferably from 0.1:1 to 2:1, and the molar ratio of metal compound i) to acid iii) is from 0.01:1 to 100:1, preferably from 0.1:1 to 1:1.

The copolymerization process of the present invention for preparing carbon monoxide copolymers can be carried out either batchwise or continuously.

Suitable reaction parameters for preparing copolymers of carbon monoxide and olefinically unsaturated compounds have been found to be pressures of from 100 to 500000 kPa, preferably from 500 to 350000 kPa and in particular from 1000 to 10000 kPa, and temperatures of from −50 to 400° C., preferably from 10 to 250° C. and in particular from 20 to 150° C.

The polymerization reactions can be carried out in the gas phase in a fluidized bed or stirred, in suspension, in liquid and supercritical monomers and in solvents which are inert under the polymerization conditions.

Suitable solvents or suspension media for the process of the present invention are, in particular, those which are protic or comprise a proportion of a protic component. Examples of suitable solvents or suspension media are low molecular weight alcohols such as methanol, ethanol, i- and n-propanol or water; preference is given to using methanol as solvent/suspension medium or as solvent/suspension medium component.

The polymerization reactions can also be carried out in a virtually alcohol-free or water-free polymerization medium. This means that apart from possibly the ligands $L^1$ and $L^2$, no further alcohol or water is present in the reaction mixture of monomers, catalyst and possibly inert solvent or suspension medium.

Suitable inert solvents and suspension media are those containing no hydroxyl group in the molecule, ie. ethers such as diethyl ether, tetrahydrofuran, aromatic solvents such as benzene, toluene, ethylbenzene, chlorobenzene, aliphatic hydrocarbons such as i-butane or chlorinated aliphatic hydrocarbons such as dichloromethane, trichloromethane or mixtures of the compounds mentioned.

A well-suited polymerization method has been found to be initially charging the catalyst in an inert solvent and subsequently adding the monomers and carrying out the polymerization at from 20 to 150° C. and a pressure of from 1000 to 10000 kPa.

The resulting carbon monoxide copolymers can be obtained with a narrow molecular weight distribution. These copolymers have values for $M_w/M_n$ of from 1.02 to 6.0, preferably from 1.05 to 4.5 (determined by gel permeation chromatography using a polymethyl methacrylate standard).

The copolymerization process described can likewise be carried out in the presence of an oxidizing agent such as benzoquinone or naphthoquinone and/or hydrogen.

The resulting carbon monoxide copolymers can be processed by means of injection molding, extrusion or spin-coating. They can also be employed for coating metallic, ceramic and other surfaces, eg. of plastics.

The carbon monoxide copolymers of the present invention are suitable for producing fibers, films, moldings and coatings.

The catalyst systems of the present invention based on metal complexes (I) provide a simple route to numerous slightly modified catalysts for the copolymerization of carbon monoxide with olefinically unsaturated compounds. Furthermore, the starting compounds used are halogen-free, unproblematical to handle and readily available, ie. inexpensive, so that even wide-ranging catalyst screening is made possible.

EXAMPLES

Abbreviations:
Pd(OAc)$_2$: palladium diacetate
dpmpa: bis(diphenylphosphinomethyl)phenylamine
dpmba: bis(diphenylphosphinomethyl)-t-butylamine
dpmsa: bis(diphenylphosphinomethyl)-2-(triethylammonium ethylsulfonate)amine
dpmma: bis(diphenylphosphinomethyl)methylamine
dpmta: bis(diphenylphosphinomethyl)(triphenylsilyl)amine
dpmha: bis(diphenylphosphinomethyl)(p-hydroxyphenyl)amine
dpmaa: bis(diphenylphosphinomethyl)(dimethylamino)amine
p-TSA: p-toluenesulfonic acid
PK: polyketone

A. General Procedure of the Preparation of Metal Complexes (I)

The metal dihalide chelate complex (MC) was dissolved in 20 ml of acetonitrile. The silver salt (SS) was then added, the mixture was stirred for 18 hours at room temperature, the precipitate formed was filtered off and the product was isolated from the filtrate by evaporation and addition of diethyl ether.

B. Preparation Examples for Cationic Metal Complexes a) Preparation of monocationic complexes

Example 1: [(dpmpa)PdCl(MeCN)](ClO$_4$)

| (MC): | (dpmpa)PdCl$_2$ | 642 mg | 0.963 mmol |
|---|---|---|---|
| (SS): | AgClO$_4$ | 221 mg | 1.066 mmol |
| Yield: 407 mg (48%) | | | |
| Elemental analysis: | Calculated: C: 52.9; H: 4.18; O: 8.29; N: 3.63; P: 8.03; Pd: 13.79. | Found: C: 51.0; H: 3.9; O: 9.2; N: 2.9; P: 7.5; Pd: 13.0. | | b) Preparation of dicationic complexes

Example 2 i) [(dpmpa)Pd(MeCN)$_2$](ClO$_4$)$_2$

| (MC): | (dpmpa)PdCl$_2$ | 868 mg | 1.302 mmol |
|---|---|---|---|
| (SS): | AgClO$_4$ | 638 mg | 2.831 mmol |
| Yield: 1.1 g (88%) | | | |
| Elemental analysis: | Calculated: C: 49.31; H: 4.02; O: 4.79; N: 14.80; P: 7.06; Pd: 12.14. | Found: C: 47.4; H: 4.2; O: 4.5; N: 15.0; P: 6.7; Pd: 11.3. | | ii) [(dpmpa)Pd(MeCN)$_2$](PF$_6$)$_2$

| (MC): | (dpmpa)PdCl$_2$ | 1000 mg | 1.5 mmol |
|---|---|---|---|
| (SS): | AgPF$_6$ | 834 mg | 3.3 mmol |
| Yield: 1.3 g (90%) | | | |
| Elemental analysis: | Calculated: C: 44.67 H: 3.64 N: 4.34 P: 12.80 Pd: 10.99 | Found: 42.5 3.8 4.5 12.4 10.4 | | iii) [(dpmpa)Pd(MeCN)$_2$](BF$_4$)$_2$

| (MC): | (dpmpa)PdCl$_2$ | 1000 mg | 1.5 mmol |
|---|---|---|---|
| (SS): | AgBF$_4$ | 642 mg | 3.3 mmol |
| Yield: 1.21 g (95%) | | | | iv) [(dpmpa)Pd(MeCN)$_2$](SO$_3$CF$_3$)$_2$

| (MC): | (dpmpa)PdCl$_2$ | 1000 mg | 1.5 mmol |
|---|---|---|---|
| (SS): | AgSO$_3$CF$_3$ | 848 mg | 3.3 mmol |
| Yield: 1.45 g (99%) | | | | v) [(dpmpa)Pd(MeCN)$_2$](CO$_2$CF$_3$)$_2$

| (MC): | (dpmpa)PdCl$_2$ | 1000 mg | 1.5 mmol |
|---|---|---|---|
| (SS): | AgCO$_2$CF$_3$ | 729 mg | 3.3 mmol |
| Yield: 0.56 g (41%) | | | |
| Elemental analysis: | Calculated: C: 53.14 H: 4.90 N: 4.65 P: 6.85 Pd: 11.77 | Found: 51.9 3.7 4.9 7.2 12.6 | | vi) [(dpmpa)Pd(MeCN)$_2$](SO$_3$C$_6$H$_4$CH$_3$)$_2$

| (MC): | (dpmpa)PdCl$_2$ | 1000 mg | 1.5 mmol |
|---|---|---|---|
| (SS): | AgSO$_2$C$_6$H$_4$CH$_3$ | 920 mg | 3.3 mmol |
| Yield: 1.16 g (76%) | | | |
| Elemental analysis: | Calculated: C: 58.85 H: 4.84 N: 4.12 P: 6.07 Pd: 10.43 | Found: 56.6 4.7 4.5 5.9 9.9 | |

Example 3 i) [(dpmba)Pd(MeCN)$_2$](ClO$_4$)$_2$

| (MC): | (dpmba)PdCl$_2$ | 1.65 g | 22.55 mmol |
|---|---|---|---|
| (SS): | AgClO$_4$ | 1.262 g | 5.60 mmol |
| Yield: 2.215 g (100%) | | | | ii) [(dpmba)Pd(MeCN)$_2$](PF$_6$)$_2$

| (MC): | (dpmba)PdCl$_2$ | 1000 mg | 1.55 mmol |
|---|---|---|---|
| (SS): | AgPF$_6$ | 862 mg | 3.41 mmol |
| Yield: 1.17 g (80%) | | | | iii) [(dpmba)Pd(MeCN)$_2$](BF$_4$)$_2$

| (MC): | (dpmba)PdCl$_2$ | 1000 mg | 1.55 mmol |
|---|---|---|---|
| (SS): | AgBF$_4$ | 664 mg | 3.41 mmol |
| Yield: 1.18 g (87%) | | | |
| Elemental analysis: | Calculated: C: 49.1 H: 4.73 N: 4.05 P: 7.45 Pd: 12.8 | Found: 47.6 4.7 4.9 7.1 11.8 | | iv) [(dpmba)Pd(MeCN)$_2$](SO$_3$CF$_3$)$_2$

| (MC): | (dpmba)PdCl$_2$ | 1000 mg | 1.55 mmol |
|---|---|---|---|
| (SS): | AgSO$_3$CF$_6$ | 876 mg | 3.41 mmol |
| Yield: 1.0 g (67%) | | | |
| Elemental analysis: | Calculated: C: 45.22 H: 4.11 N: 4.39 P: 6.48 Pd: 11.13 | Found: 44.3 4.3 4.4 6.5 11.0 | | v) ](dpmba)Pd(MeCN)$_2$](CO$_2$CF$_3$)$_2$

| (MC): | (dpmba)PdCl$_2$ | 1000 mg | 1.55 mmol |
|---|---|---|---|
| (SS): | AgCO$_2$CF$_3$ | 753 mg | 3.41 mmol |
| Yield: 1.36 g (99%) | | | | vi) [(dpmba)Pd(MeCN)$_2$](SO$_3$C$_6$H$_4$CH$_3$)$_2$

| (MC): | (dpmba)PdCl$_2$ | 1000 mg | 1.55 mmol |
|---|---|---|---|
| (SS): | AgSO$_2$C$_6$H$_4$CH$_3$ | 952 mg | 3.41 mmol |
| Yield: 1.1 g (71%) | | | |
| Elemental analysis: | Calculated: C: 57.63 H: 5.34 N: 4.20 P: 6.19 Pd: 10.64 | Found: 55.6 5.1 2.6 6.3 10.1 | | c) Preparation of Uncharged Complexes

Example 4

(c₁) Preparation of uncharged complexes

Procedure for the preparation of defined Pd(OAc)$_2$ complexes starting from Pd(OAc)$_2$ Pd(OAc)$_2$ was dissolved in 100 ml of acetone, stirred for 2 hours at room temperature and subsequently filtered. The chelating ligand suspended in 40 ml of acetone was added to the above solution. The palladium complex formed precipitated as a yellow solid and was filtered off on a glass frit and dried under reduced pressure.

| | | |
|---|---|---|
| i) (dpmpa)Pd(OAc)$_2$ | | |
| dpmpa | 1.957 g | 4.0 mmol |
| Pd(OAc)$_2$ | 0.99 g | 4.4 mmol |
| Yield: 2.07 g (72%) | | |
| ii) (dpmta)Pd(OAc)$_2$ | | |
| Pd(OAc)$_2$ | 0.17 g | 0.744 mmol |
| dpmta | 0.5 g | 0.744 mmol |
| Yield: 0.62 g (75%) | | |
| iii) dpmmaPd(OAc)$_2$ | | |
| Pd(OAc)$_2$ | 0.47 g | 2.08 mmol |
| dpmma | 0.86 g | 2.08 mmol |
| Yield: 0.89 g (67%) | | |

(c₂) Procedure for the preparation of defined Pd(OAc)$_2$ complexes starting from PdCl$_2$ complexes The (chelating phosphine) PdC$_{12}$ complex (MC) was dissolved in 10 ml of methylene chloride and admixed with silver acetate (SS). The suspension obtained was stirred overnight, the solvent was reduced to half and the (chelating phosphine)palladium acetate complex was precipitated by addition of diethyl ether. Filtration under argon and drying in a high vaccum gave the desired chelate complex.

Example 5

| | | | |
|---|---|---|---|
| i) dpmbaPd(OAc)$_2$ | | | |
| (MC): | PdmbaPdCl$_2$ | 1.0 g | 1.55 mmol |
| (SS): | AgOAc | 0.57 g | 3.41 mmol |
| Yield: 0.93 g (87%) | | | |
| iI) dpmhaPd(OAc)$_2$ | | | |
| (MC): | dpmhaPdCl$_2$ | 1.0 g | 1.46 mmol |
| (SS): | AgOAc | 0.54 g | 3.25 mmol |
| Yield: 0.98 g(92%) | | | |
| iii) dpmsaPd(OAc)$_2$ | | | |
| (MC): | dpmsaPdCl$_2$ | 0.5 g | 0.62 mmol |
| (SS): | AgOAc | 0.23 g | 1.36 mmol |
| Yield: 0.53 g (100%) | | | |

Examples 6 to 40

C. Polymerization Method

1) In-situ Generation of the Catalyst

General polymerization conditions

A 0.3 l autoclave was charged with methanol, palladium diacetate, dpmpa and p-toluenesulfonic acid. The autoclave was then pressurized to the desired total pressure with ethylene and carbon monoxide at the reaction temperature selected. Temperature and pressure of the monomers were kept constant during the reaction time. The polymerization was stopped by cooling and venting the autoclave and the solvent was removed by filtration. The polyketone was dried at room temperature under reduced pressure.

The process parameters, amounts of catalyst and solvent used and also the amounts of polymer obtained and the polymer properties are shown in Table 1 (Examples 6–10).

TABLE 1

| Ex. No. | Catalyst components (mmol) | Methanol | p, T (bar, °C.) | Time (h) | Amount of product | kg PK/g Pd | Mp. (°C.) |
|---|---|---|---|---|---|---|---|
| 6 | 0.073 Pd(OAc)$_2$<br>0.274 dpmpa<br>0.73 p-TSA | 100 g | 60.85 | 15 | 76.84 g | 10.13 | 251–253 |
| 7 | 0.037 Pd(OAc)$_2$<br>0.137 dpmpa<br>0.123 p-TSA | 50 g | 60.85 | 15 | 71.87 g | 18.95 | 259 |
| 8 | 0.037 Pd(OAc)$_2$<br>0.137 dpmpa<br>0.123 p-TSA | 50 g | 80.85 | 10 | 61.69 g | 16.27 | 249 |
| 9 | 0.037 Pd(OAc)$_2$<br>0.137 dpmpa<br>0.123 p-TSA | 50 g | 50.85 | 10 | 34.68 g | 9.15 | 250–251 |
| 10 | 0.037 Pd(OAc)$_2$<br>0.274 dpmpa<br>0.0 p-TSA | 100 g | 60.85 | 15 | 0 g | 0 | n.d. |

2) Copolymerization Using Defined Cationic Palladium Complexes a) Copolymerization in a 0.3 l autoclave General polymerization conditions A 0.3 l autoclave was charged with 100 g of methanol and the appropriate cationic palladium complexes. The autoclave was then pressurized to a selected pressure with a mixture of ethylene and carbon monoxide in a molar ratio of 1:1 at the selected reaction temperature. The temperature and the partial pressures of the monomers were kept constant during the entire reaction time. After the desired reaction time, the polymerization was stopped by cooling and venting the autoclave. The product mixture was filtered and the residue was dried under reduced pressure. The experimental parameters and product properties are shown in Table 2 (Examples 11–40).

TABLE 2

| Ex. No. | Complex (mmol) | Time (h) | T (° C.) | Pressure (bar) | Amount of product | kg PK/g Pd (kg PK/g Pd/h) | M.p. (° C.) |
|---|---|---|---|---|---|---|---|
| 11 | [(dpmpa)Pd(MeCN)$_2$](ClO$_4$)$_2$' 0.025 | 10 | 80 | 200 | 49.47g | 19.9 (2.0) | 257–259 |
| 12 | [(dpmpa)Pd(MeCN)$_2$](ClO$_4$)$_2$' 0.025 | 10 | 50 | 200 | 37.38g | 15.04 (1.40) | 253 |
| 13 | [(dpmpa)Pd(MeCN)$_2$](ClO$_4$)$_2$' 0.035 | 10 | 80 | 200 | 71.43g | 23.81 (1.92) | 258 |
| 14 | [(dpmba)Pd(MeCN)$_2$](ClO$_4$)$_2$' 0.023 | 10 | 50 | 200 | 39.80g | 19.9 (1.60) | 259 |
| 15 | [(dpmba)Pd(MeCN)$_2$](ClO$_4$)$_2$' 0.035 | 2 | 80 | 200 | 40.11g | 13.37 (6.7) | 249 |
| 16 | [(dpmba)Pd(MeCN)$_2$](ClO$_4$)$_2$' 0.035 | 1 | 80 | 200 | 31.39g | 10.46 (10.46) | 254–256 |
| 17 | [(dpmba)PdCl(MeCN)](ClO$_4$) 0.013 | 10 | 80 | 200 | 11.02g | 8.48 (0.85) | 257–259 |
| 18 | [(dpmba)Pd(MeCN)$_2$](ClO$_4$)$_2$' 0.035 | 0.25 | 80 | 200 | 9.6 g | 3.2 (12.8) | n.d. |
| 19 | [(dpmba)Pd(MeCN)$_2$](ClO$_4$)$_2$' 0.0105 | 3 | 80 | 200 | 25.7 g | 27.9 (9.3) | n.d. |
| 20 | [(dpmpa)Pd(MeCN)$_2$](PF$_6$)$_2$ 0.025 | 5 | 80 | 60 | 21.0 g | 8.5 (1.7) | n.d. |
| 21 | [(dpmpa)Pd(MeCN)$_2$](SO$_3$CF$_3$)$_2$ 0.025 | 5 | 80 | 60 | 18.8 g | 7.85 (1.57) | n.d. |
| 22 | [(dpmpa)Pd(MeCN)$_2$](CO$_3$CF$_3$)$_2$ 0.025 | 5 | 80 | 60 | 24.80g | 8.55 (1.71) | |
| 23 | [(dpmpa)Pd(MeCN)$_2$](SO$_3$C$_6$H$_4$CH$_3$)$_2$ 0.025 | 5 | 80 | 60 | 16.2 g | 6.3 (1.26) | |
| 24 | [(dpmba)Pd(MeCN)$_2$](ClO$_4$)$_2$ 0.025 | 2 | 90 | 200 | 21.9 g | 10.43 (5.21) | |
| 25 | [(dpmba)Pd(MeCN)$_2$](ClO$_4$)$_2$ 0.025 | 2 | 110 | 200 | 20.8 | 9.81 (4.9) | |
| 26 | [(dpmba)Pd(MeCN)$_2$](ClO$_4$)$_2$ | 2 | 130 | 200 | 11.6 | 5.47 (2.73) | |
| 27 | [(dpmba)Pd(MeCN)$_2$](ClO$_4$)$_2$ 0.025 | 2 | 90 | 60 | 17.3 | 8.24 (4.12) | |
| 28 | [(dpmba)Pd(MeCN)$_2$](ClO$_4$)$_2$ 0.025 | 2 | 90 | 100 | 18.9 | 9.0 (4.5) | |
| 29 | [(dpmba)Pd(MeCN)$_2$](ClO$_4$)$_2$ 0.025 | 2 | 90 | 150 | 17.76 | 17.76 (8.88) | |
| 30 | [(dpmba)Pd(MeCN)$_2$](ClO$_4$)$_2$ 0.0025 | 2 | 90 | 200 | 10.43 | 10.43 (5.21) | |
| 31 | [(dpmba)Pd(MeCN)$_2$](PF$_6$)$_2$ 0.025 | 5 | 90 | 60 | 16.3 g | 7.7 (1.54) | |
| 32 | [(dpmba)Pd(MeCN)$_2$](SO$_3$CF$_3$)$_2$ 0.025 | 5 | 90 | 60 | 31.5 g | 12.0 (2.4) | |
| 33 | [(dpmba)Pd(MeCN)$_2$](CO$_2$CF$_3$)$_2$ 0.025 | 5 | 90 | 60 | 18.0 g | 7.35 (1.47) | |
| 34 | [(dpmba)Pd(MeCN)$_2$](SO$_3$C$_6$H$_4$CH$_3$)$_2$ 0.0125 | 5 | 90 | 60 | 22.5 | 17.8 (3.56) | |
| 35 | [(dpmba)Pd(MeCN)$_2$](SO$_3$C$_6$H$_4$CH$_3$)$_2$ 0.025 | 5 | 90 | 60 | 34.2 | 13.55 (2.71) | |
| 36 | [(dpmsa)Pd(MeCN)$_2$](ClO$_4$)$_2$ 0.025 | 5 | 70 | 60 | 14.1 | 5.15 (1.03) | |
| 37 | [(dpmsa)Pd(MeCN)$_2$](CO$_2$CF$_3$)$_2$ 0.025 | 5 | 80 | 60 | 10.2 | 3.85 (0.77) | |
| 38 | [(dpmsa)Pd(MeCN)$_2$](SO$_3$C$_6$H$_4$CH$_3$)$_2$ 0.025 | 5 | 70 | 60 | 7.4 | 2.8 (0.56) | |
| 39 | [(dpmma)Pd(MeCN)$_2$](ClO$_4$)$_2$ 0.025 | 5 | 90 | 60 | 9.7 | 3.6 (0.72) | |
| 40 | [(dpmma)Pd(MeCN)$_2$](SO$_3$C$_6$H$_4$CH$_3$)$_2$ 0.025 | 5 | 90 | 60 | 5.7 | 2.15 (0.43) | | b) Copolymerization in a 1.2 1 autoclave

General polymerization conditions

A 1.2 1 autoclave was charged with 600 g of methanol and the appropriate palladium compound. The autoclave was then pressurized to 200 bar with a mixture of ethylene and carbon monoxide in a molar ratio of 1:1 at 80° C. The temperature and the partial pressures of the monomers were kept constant during the entire reaction time. After a reaction time of 5 hours, the polymerization was stopped by cooling and venting the autoclave. The product mixture was filtered and the residue was dried under reduced pressure. The experimental parameters and product properties are shown in Table 3.

TABLE 3

| Ex. No. | Complex (mmol) | Amount of Product | kg PK/g Pd (kg PK/g Pd/h) | Mp. (° C.) |
|---|---|---|---|---|
| 41 | [(dpmba)Pd(MeCN)$_2$] (ClO$_4$)$_2$ 0.105 | 273.0 g | 30.33 (4.9) | 263 |
| 42 | [(dpmba)Pd(MeCN)$_2$] (ClO$_4$)$_2$ 0.070 | 153.0 g | 25.5 (4.1) | 269 |

3) Copolymerization Using Defined Uncharged Palladium Complexes a) Copolymerization in a 0.3 l autoclave General polymerization conditions A 0.3 l autoclave was charged with 100 ml of methanol and the appropriate uncharged palladium complex and the appropriate acid or anilinium tetrakis(pentafluorophenyl) borate (borate for short) were added. The autoclave was then pressurized to a selected pressure with a mixture of ethylene and carbon monoxide in a molar ratio of 1:1 at the selected reaction temperature. The temperature and the partial pressures of the monomers were kept constant during the entire reaction time. After the desired reaction time, the polymerization was stopped by cooling and venting the autoclave. The product mixture was filtered and the residue was dried under reduced pressure. The experimental parameters and product properties are shown in Table 4 (Examples 43–59).

b) Copolymerization in a 2.5 l autoclave

General polymerization conditions

A 2.5 l autoclave was charged with 790 g of methanol, it was pressurized with 30 bar of CO/ethene (1:1) and was heated to 90° C. The selected palladium acetate complex and the acid were taken up in 50 g of methanol and introduced into the autoclave via a lock using an ethylene gauge pressure of 5 bar. The autoclave was subsequently pressurized to a total pressure of 60 bar with a 1:1 mixture of CO/ethene. The temperature and the partial pressures of the monomers were kept constant during the entire reaction time. After a reaction time of 1 hour, the polymerization was stopped by cooling and venting the autoclave, the product mixture was filtered and the residue was dried under reduced pressure. The experimental parameters and product properties are shown in Table 5 below.

TABLE 4

| Ex. No. | Complex (mmol) | Acid or borate (mmol) | Time (h) | T (° C.) | Pressure (bar) | Amount of product | kg PK/g Pd (kg PK/g Pd/h) |
|---|---|---|---|---|---|---|---|
| 43 | (dpmpa)Pd(OAc)$_2$ 0.025 | p-TSA 0.09 | 0.5 | 80 | 200 | 21.6g | 8.05 (16.1) |
| 44 | (dpmta)Pd(OAc)$_2$ 0.125 | p-TSA 0.5 | 5 | 90 | 60 | 10.4g | 7.8 (1.56) |
| 45 | (dpmsa)Pd(OAc)$_2$ 0.01 | p-TSA 0.4 | 5 | 90 | 60 | 3.3g | 3.1 (0.62) |
| 46 | (dpmha)Pd(OAc)$_2$ 0.01 | p-TSA 0.04 | 5 | 90 | 60 | 4.2g | 4.15 (0.83) |
| 47 | (dpmaa)Pd(OAc)$_2$ 0.01 | p-TSA 0.04 | 5 | 90 | 60 | 10.3g | 12.2 (2.44) |
| 48 | (dpmma)Pd(OAc)$_2$ 0.01 | p-TSA 0.4 | 5 | 90 | 60 | 0.5g | 0.4 (0.1) |
| 49 | (dpmba)Pd(OAc)$_2$ 0.01 | p-TSA 0.04 | 5 | 90 | 60 | 6.9g | 7.8 (1.56) |
| 50 | (dpmpa)Pd(OAc)$_2$ 0.01 | p-TSA 0.02 | 5 | 90 | 60 | 14.1g | 13.5 (2.7) |
| 51 | (dpmpa)Pd(OAc)$_2$ 0.01 | p-TSA 0.04 | 5 | 90 | 60 | 11.6g | 11.1 (2.22) |
| 52 | (dpmpa)Pd(OAc)$_2$ 0.01 | p-TSA 0.06 | 5 | 90 | 60 | 28.3g | 27.1 (5.42) |
| 53 | (dpmpa)Pd(OAc)$_2$ 0.01 | CF$_3$SO$_3$H 0.04 | 2 | 90 | 60 | 15.6g | 15.5 (7.74) |
| 54 | (dpmpa)Pd(OAc)$_2$ 0.01 | CF$_3$COOH 0.4 | 2 | 90 | 60 | 12.9g | 12.8 (6.8) |
| 55 | (dpmpa)Pd(OAc)$_2$ 0.01 | FSO$_3$H 0.4 | 2 | 90 | 60 | 9.6g | 9.52 (4.56) |
| 56 | (dpmpa)Pd(OAc)$_2$ 0.01 | H$_3$PO$_4$ 0.4 | 5 | 90 | 60 | 4.8g | 4.6 (0.92) |
| 57 | (dpmpa)Pd(OAc)$_2$ 0.01 | HNO$_3$ 0.4 | 5 | 90 | 60 | 6.0g | 5.75 (1.15) |
| 58 | (dpmpa)Pd(OAc)$_2$ 0.01 | borate 0.03 | 5 | 90 | 60 | 6.9 | 6.85 (1.37) |
| 59 | (dpmpa)Pd(OAc)$_2$ 0.01 | H$_2$SO$_4$ 0.4 | 2 | 90 | 60 | 19.9 | 19.06 (9.53) |

TABLE 5

| Ex. No. | Complex (mmol) | Acid (mmol) | T (° C.) | Pressure (bar) | Amount of product | kg PK/g Pd (kg PK/g Pd/h) | $M_n$[a] (g/mol) | $M_w/M_n$[a] |
|---|---|---|---|---|---|---|---|---|
| 60 | (dpmpa)Pd(OAc)$_2$ 0.019 | p-TSA 7.15 | 90 | 60 | 170 g | 8.68 | 7600 | 3.2 |
| 61 | (dpmpa)Pd(OAc)$_2$ 0.1 | p-TSA 7.15 | 90 | 60 | 142 g | 14.18 | 10200 | 3.6 |
| 62 | (dpmpa)Pd(OAc)$_2$ 0.04 | p-TSA 1.61 | 90 | 60 | 75 g | 18.34 | 15700 | 4.0 |
| 63 | (dpmpa)Pd(OAc)$_2$ 0.02 | p-TSA 0.8 | 90 | 60 | 40 g | 18.91 | 13100 | 4.2 |

TABLE 5-continued

| Ex. No. | Complex (mmol) | Acid (mmol) | T (° C.) | Pressure (bar) | Amount of product | kg PK/g Pd (kg PK/g Pd/h) | $M_n$ a) (g/mol) | $M_w/M_n$ a) |
|---|---|---|---|---|---|---|---|---|
| 64 | (dpmpa)Pd(OAc)$_2$ 0.01 | p-TSA 0.4 | 90 | 60 | 20.5 g | 20.48 | n.d. | n.d. |
| 65 | (dpmpa)Pd(OAc)$_2$ 0.01 | p-TSA 0.4 | 90 | 100 | 22.9 g | 22.87 | n.d. | n.d. |
| 66 | (dpmpa)Pd(OAc)$_2$ 0.005 | p-TSA 0.2 | 90 | 60 | 7.2 g | 14.8 | n.d. | n.d. |
| 67 | (dpmpa)Pd(OAc)$_2$ 0.02 | FSO$_3$H 0.8 | 90 | 60 | 41.6 g | 18.87 | n.d. | n.d. |
| 68 | (dpmpa)Pd(OAc)$_2$ 0.02 | CF$_3$COOH 0.8 | 90 | 60 | 36.5 g | 16.55 | n.d. | n.d. |
| 69 | (dpmpa)Pd(OAc)$_2$ 0.01 | H$_2$SO$_4$ 0.4 | 90 | 60 | 22.0 g | 21.08 | n.d. | n.d. | a) determined by means of gel permeation chromatography using a polymethyl methacrylate standard.

We claim:

1. A catalyst system comprising as active constituents
a) a metal complex of the formula (I)

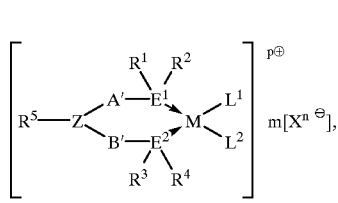

where the substituents and indices have the following meanings:

$R^5$ is hydrogen or a substituent selected from the group consisting of $C_1$–$C_{20}$-organic and $C_3$–$C_{30}$-organosilicon radicals in substituted and unsubstituted form, or a NR$^6$R$^7$ substituent or a radical of the formula II

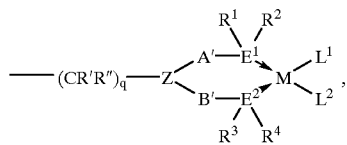

where
q is an integer from 0 to 20 and
R', R" is hydrogen or substituents selected from the group consisting of $C_1$–$C_{20}$ organic and $C_3$–$C_{30}$-organosilicon radicals and
the further substituents in (II) as in (I) have the following meanings,
M is a metal from group VIIIB of the Periodic Table of the Elements,
$E^1$, $E^2$ are elements from group VA of the Periodic Table of the Elements,
Z is an element from group VA of the Periodic Table of the Elements,
$R^1$ to $R^4$ are substituents selected, independently of one another, from the group consisting of $C_1$–$C_{20}$-organic and $C_3$–$C_{30}$-organosilicon radicals in substituted and unsubstituted form,
A', B' are $C_1$–$C_4$-alkylene units in substituted and unsubstituted form, silylene-bridged organic radicals or NR$^8$ radicals, $R^6$ to $R^8$ are hydrogen or substituents selected from the group consisting of $C_1$–$C_{20}$-organic and $C_3$–$C_{30}$-organosilicon radicals,
$L^1$, $L^2$ are formally charged or uncharged ligands,
X is a formally monovalent or polyvalent anion,
p is 0, 1, 2, 3 or 4,
m, n are 0, 1, 2, 3 or 4,
where p=m×n and
b) one or more Lewis or protic acids or a mixture of Lewis and protic acids.

2. A catalyst system as claimed in claim 1 comprising as active constituents
a) a metal complex of the formula (I),

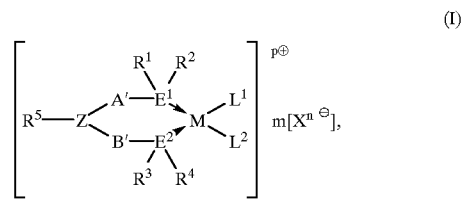

where the substituents and indices have the following meanings:

$R^5$ is hydrogen, an aliphatic radical, such as methyl, ethyl, i-propyl or t-butyl, a cycloaliphatic radical such as cyclopentyl or cyclohexyl, an aromatic radical such as phenyl, o-methoxyphenyl or 4-hydroxyphenyl, a substituent containing an anionic group, eg. —(CH$_2$)$_n$—SO$_3^-$, a substituent containing a cationic group, eg. —(CH$_2$)$_n$—NR$_3^+$, or a hydroxyl- or amino-containing substituent such as —(CH$_2$)$_n$—OH or —(CH$_2$)$_n$—NR$_2$ (n=1 to 30), where R is hydrogen, aryl or alkyl, a radical of the formula II

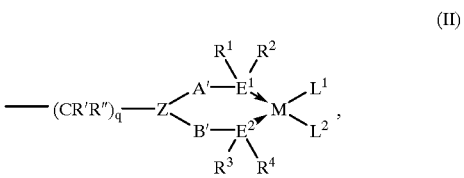

where
q is an integer from 0 to 20 and
R', R" are, independently of one another, hydrogen or $C_1$–$C_{10}$-alkyl, straight-chain or branched, such as methyl, ethyl, i-propyl or n-propyl, $C_3$–$C_{10}$-cycloalkyl such as cyclopropyl, cyclopentyl or cyclohexyl, $C_6$–$C_{14}$-aryl, such as phenyl, and the further substituents in (II) as in (I) have the following meanings, M is palladium or nickel, $E^1$, $E^2$ are nitrogen or phosphorus, Z is nitrogen, $R^1$ to $R^4$ are cyclopropyl, cyclopentyl, cyclohexyl or menthyl, i-propyl, s-butyl or t-butyl, phenyl, o-methoxyphenyl or p-trifluoromethylphenyl, pyridyl, A', B" are methylene or ethylene in substituted or unsubstituted form, benzylidene, o-phenylene, $L^1$, $L^2$ are hydride, sulfates, halides, phosphates, nitrate, acetonitrile, methanol, acetylacetone, tetrahydrofuran, acetate, trifluoroacetate, tosylate, water, X is tetrafluoroborate, hexafluorophosphate, hexafluoroantimonate, pentafluorobenzoate, trifluoromethanesulfonate, trifluoroacetate, perchlorate, p-toluenesulfonate, tetraarylborate, p is 0, 1, 2, 3 or 4, m, n are 0, 1, 2, 3 or 4, where p=m×n, and b) trifluoroacetic acid, perchloric acid, p-toluenesulfonic acid, triarylborane.

3. A catalyst system as claimed in claim 1, wherein either $L^1$ or $L^2$ is a halide.

4. A process for copolymerizing carbon monoxide with olefinically unsaturated compounds, wherein a catalyst system as claimed in claim 1 is used.

5. A process for preparing copolymers of carbon monoxide and olefinically unsaturated compounds, wherein the copolymerization is carried out in the presence of a catalyst system as claimed in claim 1.

6. A process for preparing copolymers of carbon monoxide and olefinically unsaturated compounds, wherein the copolymerization is carried out in the presence of a metal complex of the formula (I)

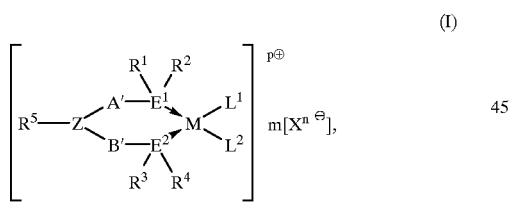

(I)

where the substituents and indices have the following meanings:

$R^5$ is hydrogen or a substituent selected from the group consisting of $C_1$–$C_{20}$-organic and $C_3$–$C_{30}$-organosilicon radicals in substituted and unsubstituted form, or an $NR^6R^7$ substituent or a radical of the formula II

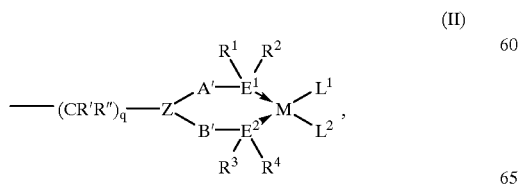

(II)

where q is an integer from 0 to 20 and

R', R" are hydrogen or substituents selected from the group consisting of $C_1$–$C_{20}$ organic and $C_3$–$C_{30}$-organosilicon radicals and the further substituents in (II) as in (I) have the following meanings, M is a metal from group VIIIB of the Periodic Table of the Elements, $E^1$, $E^2$ are elements from group VA of the Periodic Table of the Elements, Z is an element from group VA of the Periodic Table of the Elements, $R^1$ to $R^4$ are substituents selected, independently of one another, from the group consisting of $C_1$–$C_{20}$-organic and $C_3$–$C_{30}$-organosilicon radicals in substituted and unsubstituted form, A', B" are $C_1$–$C_4$-alkylene units in substituted and unsubstituted form, silylene-bridged organic radicals or $NR^8$ radicals, $R^6$ to $R^8$ are hydrogen or substituents selected from the group consisting of $C_1$–$C_{20}$-organic and $C_3$–$C_{30}$-organosilicon radicals, $L^1$, $L^2$ are uncharged ligands, X is a formally monovalent or polyvalent anion, p is 0, 1, 2, 3 or 4, m, n are 0, 1, 2, 3 or 4, where p=m×n.

7. A process for preparing copolymers of carbon monoxide and olefinically unsaturated monomer compounds, wherein the monomers are polymerized in the presence of i) a metal M selected from group VIIIB of the Periodic Table of the Elements, which is present in salt form or as a complex salt, ii) a chelating ligand of the formula (III)

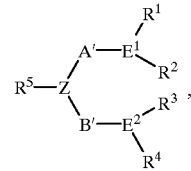

(III)

where the substituents and indices have the following meanings:

$R^5$ is hydrogen or a substituent selected from the group consisting of $C_1$–$C_{20}$-organic and $C_3$–$C_{30}$-organosilicon radicals in substituted and unsubstituted form, or an $NR^6R^7$-substituent or a radical of the formula (IV)

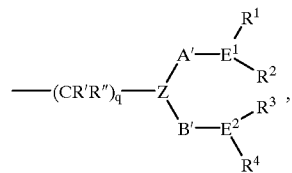

(IV)

where q is an integer from 0 to 20 and

R', R'' are hydrogen or substituents selected from the group consisting of $C_1$–$C_{20}$-organic and $C_3$–$C_{30}$-organosilicon radicals and the further substituents in (IV) as in (III) have the following meanings, $E^1$, $E^2$ are elements from group VA of the Periodic Table of the Elements, Z is an element from Group VA of the Periodic Table of the Elements, $R^1$ to $R^4$ are substituents selected, independently of one another, from the group consisting of $C_1$–$C_{20}$-organic and $C_3$–$C_{30}$-organosilicon radicals in substituted and unsubstituted form, A', B' are $C_1$–$C_4$-alkylene units in substituted or unsubstituted form, silylene-bridged organic radicals or $NR^8$ radicals, $R^6$ to $R^8$ are hydrogen or substituents selected from the group consisting of $C_1$–$C_{20}$-organic and $C_3$–$C_{30}$-organosilicon radicals and iii) one or more protic or Lewis acids or a mixture of protic and Lewis acids.

* * * * *